US009839251B2

(12) United States Patent
Pannikottu et al.

(10) Patent No.: US 9,839,251 B2
(45) Date of Patent: Dec. 12, 2017

(54) FOOTBALL HELMET LINER TO REDUCE CONCUSSIONS AND TRAUMATIC BRAIN INJURIES

(71) Applicant: Zymplr LC, Chesterfield, MO (US)

(72) Inventors: Abraham Pannikottu, Akron, OH (US); Abu Abraham, Edwardsville, IL (US)

(73) Assignee: Zymplr LC, Chesterfield, MO (US)

( * ) Notice: Subject to any disclaimer, the term of this patent is extended or adjusted under 35 U.S.C. 154(b) by 535 days.

(21) Appl. No.: 14/445,645

(22) Filed: Jul. 29, 2014

(65) Prior Publication Data

US 2015/0033453 A1  Feb. 5, 2015

Related U.S. Application Data

(60) Provisional application No. 61/860,871, filed on Jul. 31, 2013.

(51) Int. Cl.
| | |
|---|---|
| *A42B 3/00* | (2006.01) |
| *A41D 13/015* | (2006.01) |
| *A62B 17/00* | (2006.01) |
| *F41H 1/00* | (2006.01) |
| *G21F 3/02* | (2006.01) |
| *B32B 3/12* | (2006.01) |
| *B21D 39/00* | (2006.01) |
| *A42B 3/12* | (2006.01) |
| *B32B 5/22* | (2006.01) |
| *B32B 5/18* | (2006.01) |
| *A42B 3/10* | (2006.01) |
| *A42B 3/06* | (2006.01) |

(52) U.S. Cl.
CPC .............. *A42B 3/121* (2013.01); *A42B 3/064* (2013.01); *A42B 3/10* (2013.01); *A42B 3/125* (2013.01); *B32B 5/18* (2013.01); *B32B 5/22* (2013.01)

(58) Field of Classification Search
None
See application file for complete search history.

(56) References Cited

U.S. PATENT DOCUMENTS

| | | | | |
|---|---|---|---|---|
| 3,447,163 | A * | 6/1969 | Tojeiro | A42B 3/065 2/412 |
| 3,617,416 | A * | 11/1971 | Kromrey | B29D 99/0089 156/173 |
| 5,915,819 | A * | 6/1999 | Gooding | A42B 3/121 36/10 |
| 6,892,478 | B1 * | 5/2005 | Erickson | A43B 1/00 36/2.6 |
| 7,478,438 | B2 * | 1/2009 | Lolis | A41D 31/0044 2/2.5 |

(Continued)

*Primary Examiner* — Jameson Collier
(74) *Attorney, Agent, or Firm* — Ward Law Office LLC; Jacob M. Ward (57) ABSTRACT

A composite multi-axial impact protection liner for a helmet is provided that reduces rotational acceleration, rotational strain rate, and rotational strain that cause concussions. In a protective helmet so equipped, one or more layers of fluid polymer, including strain thinning and strain thickening polymers, are positioned between the wearer's head and a hard helmet shell. The liner offers greater injury protection, performance, and personal comfort using the rate dependent and combined effect of strain thinning and strain thickening of fluid polymer layers.

18 Claims, 6 Drawing Sheets

(56) References Cited

U.S. PATENT DOCUMENTS

| | | | | |
|---|---|---|---|---|
| 8,739,316 B1* | 6/2014 | Norton | ............... | A42B 1/08 |
| | | | | 2/411 |
| 2005/0281999 A1* | 12/2005 | Hofmann | ............... | B32B 5/18 |
| | | | | 428/304.4 |
| 2007/0107778 A1* | 5/2007 | Bettin | ............... | A42B 3/121 |
| | | | | 137/13 |
| 2011/0283433 A1* | 11/2011 | Holt | ............... | A43B 23/0285 |
| | | | | 2/22 |
| 2012/0186003 A1* | 7/2012 | Heger | ............... | A41D 13/015 |
| | | | | 2/412 |
| 2012/0204329 A1* | 8/2012 | Faden | ............... | A41D 31/005 |
| | | | | 2/413 |
| 2013/0000020 A1* | 1/2013 | Frederick | ............... | A41D 13/015 |
| | | | | 2/455 |
| 2014/0020157 A1 | 1/2014 | Barr | | |
| 2014/0068840 A1* | 3/2014 | Nauman | ............... | A42B 3/128 |
| | | | | 2/411 |
| 2014/0189945 A1* | 7/2014 | Golnaraghi | ............... | A42B 3/064 |
| | | | | 2/455 |
| 2014/0223649 A1* | 8/2014 | Fowler | ............... | F16B 7/044 |
| | | | | 2/455 |
| 2014/0259326 A1* | 9/2014 | Carlson | ............... | A41D 13/015 |
| | | | | 2/455 |
| 2015/0126631 A1* | 5/2015 | Bruno | ............... | A42B 3/125 |
| | | | | 521/54 |
| 2015/0257471 A1* | 9/2015 | Warmouth | ............... | A42B 3/122 |
| | | | | 2/413 |
| 2016/0295935 A1* | 10/2016 | Foster | ............... | A41D 19/01523 |
| 2016/0360818 A1* | 12/2016 | Riina | ............... | A42B 3/063 |

\* cited by examiner

FOOTBALL HELMET LINER TO REDUCE CONCUSSIONS AND TRAUMATIC BRAIN INJURIES

CROSS-REFERENCE TO RELATED APPLICATIONS

This application claims the benefit of U.S. Provisional Application No. 61/860,871, filed on Jul. 31, 2013. The entire disclosure of the above application is hereby incorporated herein by reference.

FIELD

The present disclosure relates to various types of protective headgear and helmets, and more particularly to a helmet liner configured to reduce the incidence of a rotational injury that may lead to concussion or traumatic brain injury.

INTRODUCTION

This section provides background information related to the present disclosure which is not necessarily prior art.

Sports related concussions have received increased public attention, with many federal and state governments considering or implementing laws to address the response to suspected brain injury. Hospital visits for concussions have increased 60% in recent years and researchers estimate that between 1 and 3 million sports related concussions occur each year in the United States. As one example, the sport of American football, or simply football, accounts for the highest incidence of concussions, and therefore receives the most attention. There are approximately 4.5 million athletes participating in organized football in the United States, including about 2,000 NATIONAL FOOTBALL LEAGUE® (NFL®) players, 100,000 college players, 1 million high school players, and 3 million youth players.

Studies of professional football players in the NFL® professional football league in the United States indicate that approximately 1 player in every 3 games is diagnosed with a mild traumatic brain injury, also referred to as a mild concussion. The risks of long-term cognitive deficit and cumulative effects of multiple concussions highlight the need for improvements in helmet performance.

Various types of sports helmets are used to reduce brain injuries, including skull and neck injuries, resulting from head impacts. Such helmets typically employ a hard outer shell in combination with internal padding made of an energy-absorbing material. A conventional helmet is generally designed to reduce injuries associated with linear (translational) acceleration following an impact. Bio-mechanical research has long understood, however, that angular forces can cause serious brain damage, including concussion, axonal injury, and hemorrhages. Neurological research studies show that angular or rotational forces can strain nerve cells and axons more than linear forces. Conventional helmet performance, based primarily on linear acceleration as a predictor of injury resulting from an impact, may be less reliable than newly developed biomedical indicators such as strain rate, strain, velocity, and acceleration in angular mode.

It should be noted that while it is the desire and goal of a protective helmet to reduce the likelihood of injury, conventional helmets and the helmets provided by the present disclosure cannot completely and totally prevent injury to an individual participating in a physical activity or an impact sport such as football. Furthermore, no protective equipment can completely prevent injury to a player, especially if the player uses the protective helmet in an improper manner, such as to butt, ram, or spear an opposing player for example, in violation of the rules of football. Improper use of a helmet to butt, ram, or spear an opposing player can result in severe head and/or neck injuries, paralysis, or death to the player, and may result in injury to the opposing player. No protective helmet can completely prevent head, chin, or neck injuries a player might receive while participating activities like the sport of football. The helmet of the present disclosure is believed to offer improved protection to the wearer, but it is believed that no helmet can, or will ever, totally and completely prevent head injuries or other various types of injuries for the wearer.

The present disclosure provides improvements to protective helmets that address shortcomings of existing helmet designs.

SUMMARY

In concordance with the instant disclosure, the present technology includes methods and articles of manufacture that relate to protective helmets, including athletic helmets such as a football helmet.

In some embodiments, a composite multi-axial impact protection liner for a protective device is provided. The liner includes a fluid polymer layer having at least one of a strain thickening fluid polymer and a strain thinning fluid polymer. The liner is configured to be inserted into the protective device.

In certain embodiments, a wearable protective device is provided that includes a hard shell and a composite multi-axial impact protection liner. The liner includes a fluid polymer layer having a first layer of a strain thickening fluid polymer and a second layer of a strain thinning fluid polymer. The liner is disposed within the shell.

In various embodiments, a wearable protective device is provided that includes a hard shell and a composite multi-axial impact protection liner. The liner includes a fluid polymer layer and a composite layer and is disposed within the shell. The fluid polymer layer has at least one of a strain thickening fluid polymer and a strain thinning fluid polymer. The composite layer has a distribution of structural regions and open regions, the structural regions comprising a regular or double hexagonal honeycomb structure, and at least a portion of the open regions can be filled with a polymer foam.

In another embodiment, a multi-axial impact protection liner for a protective device includes a layer of elastomer honeycomb. Single or multiple layers of the elastomer honeycomb may be employed, as desired. For example, the layer may include a regular elastomer honeycomb, or a double elastomer honeycomb.

In a further embodiment, a multi-axial impact protection liner for a protective device includes a layer of highly crosslinked elastomer having a hardness of 10-20 shore A. Single or multiple layers of the highly crosslinked elastomer may be employed, as desired.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. The accompanying figures, which are incorporated in and constitute a part of this specification, illustrate several aspects and together with the description serve to explain the principles of the present technology.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding the methods disclosed, the order of the steps presented is exemplary in nature, and thus, the order of the steps can be different in various embodiments. Except where otherwise expressly indicated, all numerical quantities in this description indicating numerical values are to be understood as modified by the word "about" in describing the broadest scope of the technology.

A helmet for protecting a wearer's head is provided. The helmet includes a helmet liner having a strain thickening and a strain thinning fluid system, where the liner can reduce the chance of a concussion or traumatic brain injury associated with multidirectional head impacts. The helmet liner can reduce traumatic brain injury sustained by players during both linear (translational) impact and during angular (rotational) impact. The helmet liner can comprise a composite multi-axial impact protection liner (CMIPL) that has a dual or a multilayer fluid system with a combination of strain thickening and strain thinning fluid polymer layers. The CMIPL reduces the rotational acceleration, rotational strain rate, and rotational strain that can result in a concussion. In a CMIPL equipped helmet, one or more thin hybrid sandwich layers of strain thinning and strain thickening polymer fit on the wearer's head underneath a helmet shell. In certain embodiments, the one or more thin hybrid sandwich layers can be positioned underneath the helmet and padding provided within the helmet. For example, the CMIPL can be positioned between the wearer's head and a conventional helmet. The CMIPL can be removably inserted into the helmet or can be permanently affixed to the helmet. The CMIPL technology offers greater injury protection, performance, and personal comfort using the rate-dependent combined effect of strain thinning and strain thickening polymer layers.

In some embodiments, use of the CMIPL within a football helmet can provide up to a 50% reduction in rotational impact force transferred to a wearer's skull. The CMIPL technology functions similar to the fluid separating the brain and the skull in the head. The CMIPL includes an active viscoelastic fluid liner, which reduces the rotational acceleration to the brain from an impact. The CMIPL can reduce the rotational acceleration by more than 50% where the reduced acceleration can result in a clinically significant lower risk of concussion. The CMIPL can protect the brain from the rotational or shearing force from an off-center hit on the helmet. The CMIPL can be configured to work with various helmets, including helmets provided by manufacturers such as Riddell, Schutt, Rawlings, Xenith, and SG Helmets.

The CMIPL can include a fluid polymer liner that can absorb, distribute and dissipate the force of impact, including the most harmful rotational impact, using the fluid viscoelastic property of the liner. In certain embodiments, the CMIPL can include a liner of various thickness, including thicknesses ranging from 1 millimeter to about 10 millimeters. In one embodiment, the liner can be a 4 millimeter thick polymer sandwich. The CMIPL can be positioned between an outer shell of the helmet and foam padding that contacts the wearer's head. The CMIPL can serve as a fluid protection layer in the event of rotational impact. For example, the CMIPL can be an additional layer on the top of preexisting foamed or inflatable helmet pads, minimizing any difference in the way the modified helmet feels on the wearer's head. However, the CMIPL provides a significant effect in reducing rotational strain rate and deceleration following an impact.

Computer simulation shows that the CMIPL reduces football field radial G-force, reducing the rotational impact force on the brain by up to 50% or more, which in turn can result in up to a 50% or greater reduction in rotational impact that can result in a concussion. Magnetic resonance imaging (MRI) and computer tomography (CT) are used to investigate the mechanics of brain injury and brain development related to head injuries. Deformation of the human brain can be measured in tagged magnetic resonance images obtained dynamically during angular acceleration of the head. Quantitative experimental data have shown the mechanics of traumatic brain injury (TBI). Dynamic models of brain deformation on rotational impact can be employed to optimize and configure the CMIPL for certain uses and functions, including tailoring the CMIPL for incorporation into particular helmet designs.

Various CMIPL designs can be employed in the present technology. Such designs can include a combination of active and passive protection systems. The CMIPL designs can provide the desired stiffness and rotational flexibility for protection of the wearer's head while at the same time provide active rate dependent dissipation of impact energy. In some embodiments, the CMIPL can provide protection using two active polymer viscoelastic fluids in a sandwich liner configuration. For example, the two active polymer viscoelastic fluids can have a with total sandwich thickness of 4 mm. In other embodiments, the CMIPL can use a polymer composite having an active viscoelastic layer and a honeycomb layer to provide protection. The viscoelastic layer and the honeycomb layer can have a total thickness of 4 mm, for example.

The CMIPL design mitigates the effect of various impacts upon the wearer. Types of impacts include three major forces acting on the helmet during impact: contact force, linear force, and rotational force. The CMIPL design, in particular, addresses issues relating to rotational force, which is a shortcoming in many conventional helmet designs. Helmets incorporating the CMIPL provide stiffness for protection of the wearer's head while also providing active dissipation of rotational impact energy common to off-center impacts.

Figure 1A:
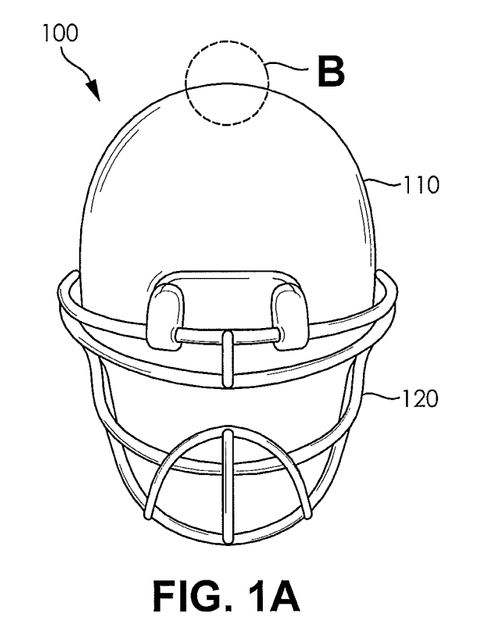
FIGS. 1A and 1B depict a protective helmet configured for the sport of football, where panel A is a front perspective view and panel B is partial cross-section of the shell.
Figure 1B:
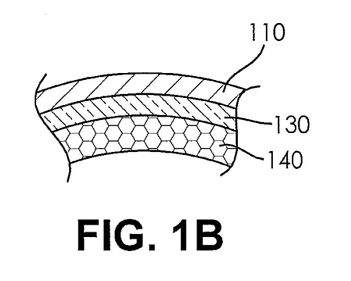

Shown in FIG. 1A is a protective helmet 100 configured for the sport of football, where a shell 110 covers a portion of the head of the wearer and a mask 120 covers a portion of the face of the wearer. The shell 110 and mask 120 can be coupled together by various means. FIG. 1B shows a partial cross-section of the helmet 100 with a CMIPL 130 positioned between the shell 110 and a padding layer 140. The padding layer 140 can include one or more pieces of padding material, such as various compressible materials, foam materials, air or other gas bladders, liquid bladders, and inflatable materials. The CMIPL 130 is shown intermediate the shell 110 and the padding layer 140, but could be configured in other ways. For example, other embodiments include where the padding layer 140 is intermediate the shell 110 and the CMIPL 130, where the CMIPL is integrated within the shell 100 or padding layer 140, and where there are more than one CMIPL 130 layers. That is, embodiments include various laminates of one or more shells 110, one or more CMIPLs 130, and one or more padding layers 140 positioned in various orders, with typically one shell 110 occupying the outermost position.

The helmet 100 does its intended job of absorbing linear impacts when the padding layer 140 inside its shell compresses upon hitting an object, absorbing the impact and dissipating the energy quickly and efficiently. This process unfolds over a limited distance—the padding layer 140 thickness—before the foam of the padding layer 140 densifies as its pores collapse, for example. The fully compressed dense foam layer 140 becomes very resistant to additional compression or shear or rotation and the force on the head of the wearer increases dramatically, which can result in injury to the wearer's head. How much energy the padding layer 140 can dissipate before it densifies depends on the speed of impact and the makeup of the padding layer 140.

At high speeds, a stiffer padding layer 140 performs better, while at lower speeds, a softer padding layer 140 offers better protection, but no single type of padding layer 140 is optimal for all scenarios. Regardless of the padding layer 140 used, however, thicker layers generally perform better than thinner layers by absorbing more linear impact energy before densifying. Therefore it may seem like common sense to increase the physical size of the helmet 100 to accommodate a padding layer 140 having increased thickness, which is the current solution provided by all major helmet brands. What is less intuitive is that the added value of increasing padding layer 140 thickness is not serving to mitigate rotational impacts. No helmet can completely prevent serious head trauma at certain rotational speeds, considering that the energy on impact increases dramatically with the square of the radial velocity. However, the addition of one or more CMIPL 130 layers to the helmet 100 can reduce rotational impact energy.

The CMIPL 130 allows with considerable reduction in rotation impact forces even though the CMIPL 130 can be configured as a lightweight and thin layer that is designed to minimally interfere with the mobility of the wearer of the helmet 100. A helmet 100 including the CMIPL 130 can be designed for protection of various impact forces, including contact force at the location of impact/injury and inertial forces including linear acceleration and rotational acceleration, which are the primary cause of concussive injuries. Computer simulation has been used to demonstrate the interaction between a helmet and player's skull. Using numerical hydrodynamic computer simulations, it has been surprisingly discovered that medium level rotational impact can induce enough skull flexure to generate potentially damaging loads in the brain, even without direct head impact. Traumatic brain injury (TBI) can result from mechanical loads in the brain, often without skull fracture, and cause complex, long-lasting symptoms.

In particular, it was observed that rotational impact affects the brain very differently from direct impact. The primary source of injury from direct impact is the force resulting from the acceleration of the head. In contrast, in rotational shear the skull can create pressures as large as an injury-inducing impact and can result in pressure gradients in the brain that are much larger than those from direct impact. Such rotational shear occurs even when the radial head accelerations induced by an impact are much smaller than from a direct impact. For example, current helmets prevent fractured skulls, but the brain is still moving or "sloshing around" after a hit or impact to the helmet. Simulations have further shown that radial skull deformation of only about 5 degrees is large enough to generate potentially damaging loads in the brain. This is in part because rotational impact and direct impact affect the head in fundamentally different ways.

Figure 2:
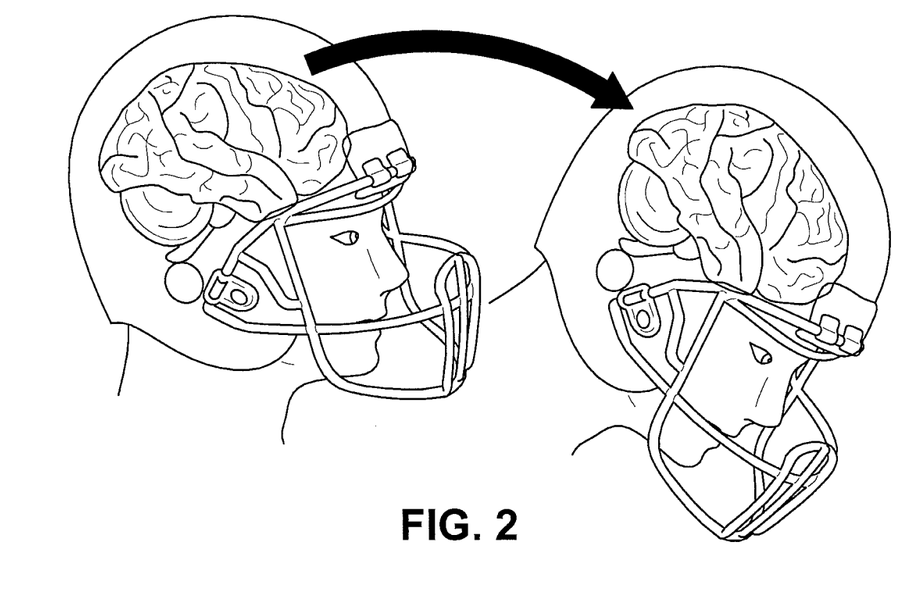
FIG. 2 schematically depicts a linear deceleration injury to a wearer of a protective helmet.

FIG. 2 shows how linear force can result in a deceleration injury. Following impact, the brain moves forward in the skull, where the frontal lobes of the brain strike inside of the skull, potentially resulting in a contusion. Next, a rebound (contre-coup) injury can occur to the occipital lobe of the brain as the brain bounces back within the skull. The linear force can further cause stretching and/or tearing of neurons in the brain stem and/or throughout the brain.

Figure 3:
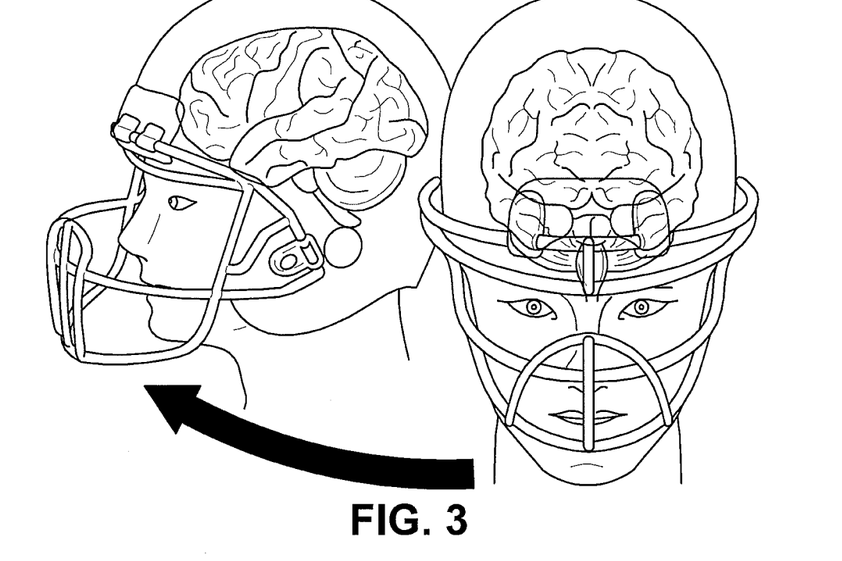
FIG. 3 schematically depicts a rotational injury to a wearer of a protective helmet.

FIG. 3 shows rotational force can result in a contusion. The brain rotates on its axis causing stretching and/or tearing of neurons. Similar stretching or tearing of blood vessels can result in a hematoma. At the end of the movement, the brain can strike the skull causing a contusion.

Figure 4:
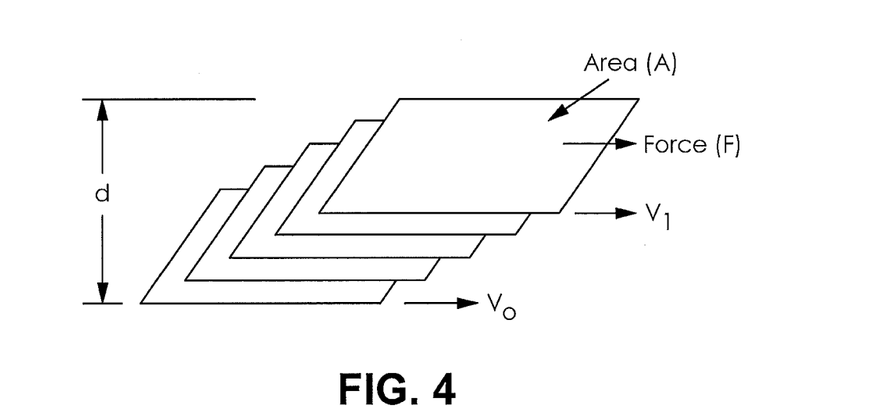
FIG. 4 graphically depicts a velocity gradient of a fluid subjected to shear.
Figure 5:
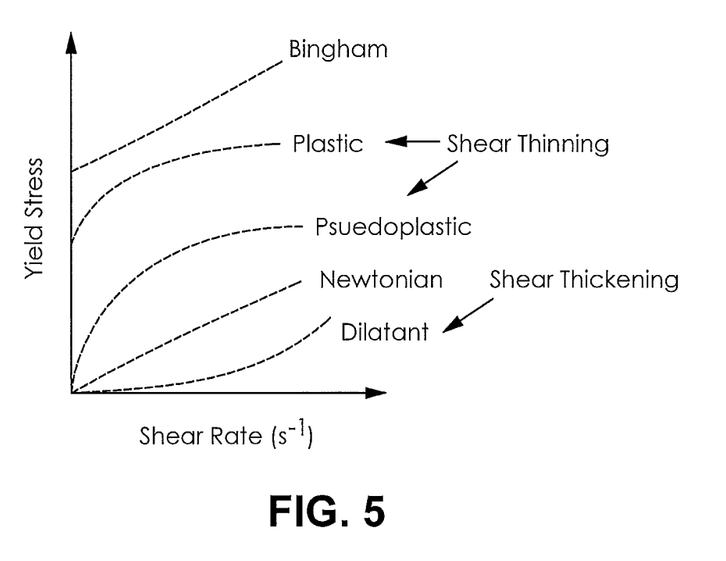
FIG. 5 graphically depicts shear thinning and shear thickening as a function of shear rate ($s^{-1}$) versus yield stress.

In one embodiment, the CMIPL 130 can include one or more layers of fluid polymers. With respect to the rheology of fluid polymers, the resistance to movement in a fluid is much like inertia and is called the viscosity of the fluid. Higher-viscosity fluids have higher resistance to flow. Stress (F/A) causes a velocity gradient (change in velocity with distance) in the fluid. The velocity gradient is thought of as a change in the shear with respect to time, a shear rate $\gamma$. The resistance to flow, viscosity is defined by $F/A = \eta(dv/dx) = \eta\gamma$, where F/A is the stress, dv/dx is the velocity gradient, $\gamma$ is the shear rate, and $\eta$ is the viscosity. See the depiction of a velocity gradient of a fluid subjected to shear in FIG. 4. When the stress and velocity gradient or shear rate are not linear, the fluid is non-Newtonian. Materials that become thinner (less viscous) at high shear rates are called shear thinning or pseudoplastic, whereas materials that thicken at high shear rates are called shear thickening or dilatant as shown in FIG. 5.

Figure 6:
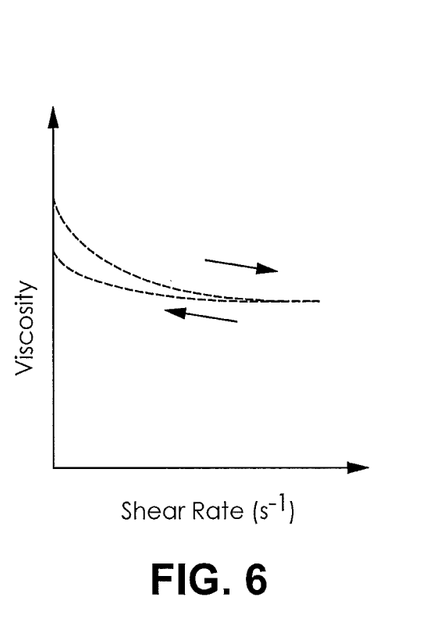
FIG. 6 graphically depicts a viscosity reduction as a function of shear rate ($s^{-1}$) versus viscosity.
Figure 7:
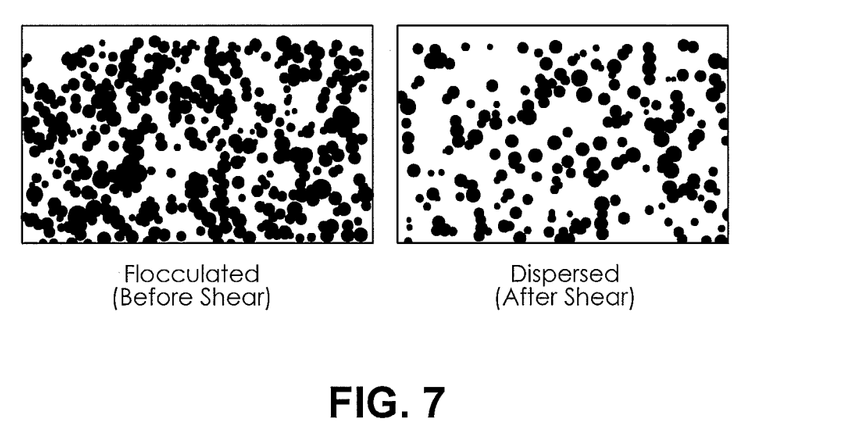
FIG. 7 schematically depicts the flocculation and dispersion of a colloid before and after shear.

A property closely related to shear-thinning is thixotropic behavior that is also a thinning the material. The differences between the two properties are that shear-thinning is dependent on shear rate, whereas thixotropic thinning is independent of shear rate but dependent on time, at a constant shear rate. Thinning with shearing over time and subsequent thickening when the shear has stopped is typical of thixotropic materials as shown in FIG. 6, where viscosity reduction is a function of shear rate. Fluid polymers can be flocculated in a non-agitated state and exhibit shear-thinning by dispersion, as illustrated in FIG. 7. In particular, FIG. 7 shows flocculation and dispersion of colloids before and after shear.

The fluid polymer provides substantial versatility, where the fluid polymer can stiffen upon impact while at all other times remain flexible and soft. This type of fluid polymer can mitigate the effect of rotational forces. Conversely, the fluid polymer can also be tailored such that it softens on impact and is stiffer at all other times. This type of fluid polymer can mitigate the effect of linear impact forces. Thus, in certain embodiments, the CMIPL can include two layers of fluid polymers, a first layer that stiffens upon impact while remaining flexible and soft at other times, and a second layer that softens upon impact while remaining stiffer at other times. These two fluid polymer layers can therefore react to reduce the effects of rotational and linear forces.

Figure 8:
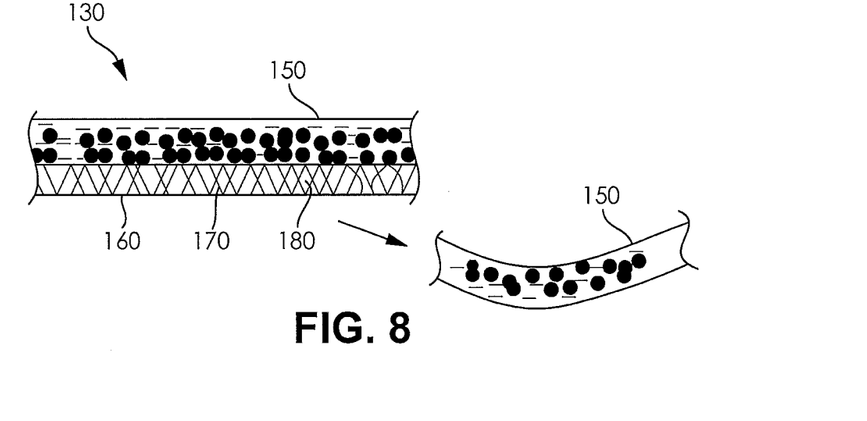
FIG. 8 schematically depicts a fluid polymer in conjunction with a sandwich backing before and after an impact/fall.

In another embodiment, the CMIPL 130 can include one or more layers of a fluid polymer 150 and a composite layer 160, as shown in FIG. 8. The composite layer 160 can include a distribution of structural regions 170 and open regions 180. The structural regions 170 and the open regions 180 can take the form of a lattice, a foam, or a plurality of repeating cells, each having contiguous and/or non-contiguous open spaces or voids distributed therethrough.

Testing has determined that the use of high stiffness/high density foam defeats the purpose of cushioning/padding in a helmet, while use of low stiffness foam hinders routine motion. The CMIPL 130 including the fluid polymer 150 and the composite layer 160 offers strain sensitivity characteristics, where under normal operation (corresponding to lower strain conditions) the CMIPL 130 remains stiff, however, during increased strain conditions, such as during an impact, the CMIPL 130 softens to provide cushion/padding.

The CMIPL 130 shown in FIG. 8 can be placed/attached over an existing padding layer 140 or bonded to the shell 110. One feature of the design is the inclusion of a shear thinning fluid polymer 150 that is pre-adjusted to the impact forces and patterns of rotational impact. The composite layer 160 can be configured to adjust the stiffness and collapse or compress following impact. Impact accordingly causes the fluid polymer 150 layer to bend, twist, or stretch, as shown to the right of the arrow in FIG. 8.

Figure 9A:
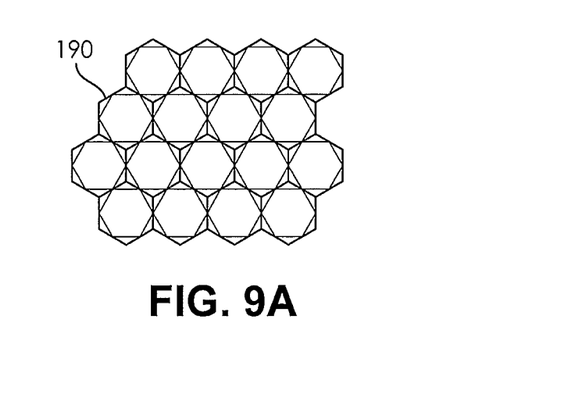
FIGS. 9A, 9B, and 9C schematically depict a double wall hexagonal structure, where panel A is a two-dimensional top plan view, panel B is a three-dimensional elevational view, and panel C shows a three-dimensional elevational view of the double wall hexagonal structure sandwiched between two layers of fluid polymer.
Figure 9B:
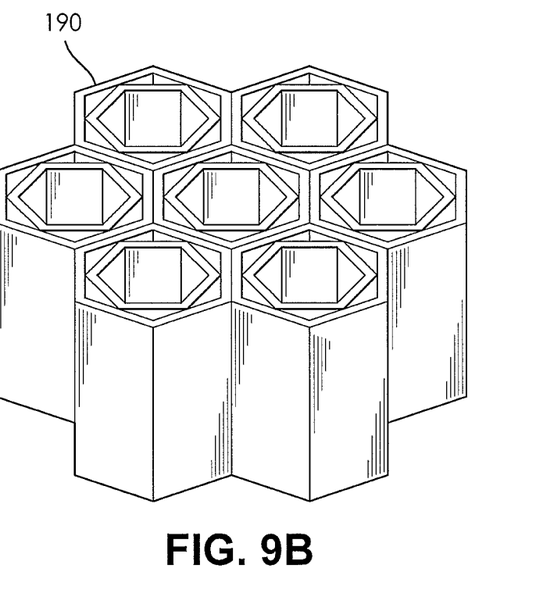
Figure 9C:
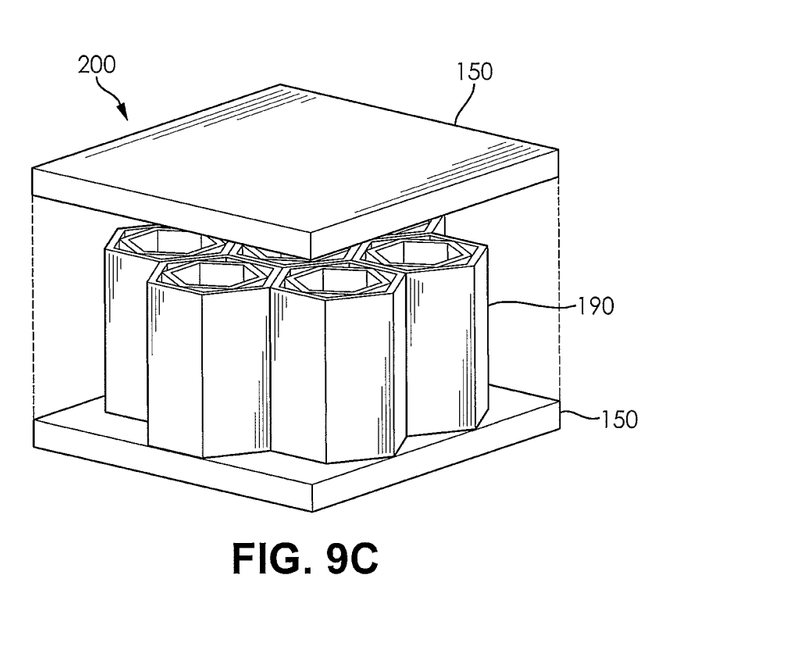

In certain embodiments, the composite layer 160 can comprise a plurality of cells having a honeycomb configuration. One such configuration includes a double hexagonal honeycomb structure 190 as shown in FIGS. 9A-C. The double hexagonal honeycomb structure includes a plurality of first hexagonal elements and a plurality of second hexagonal elements, wherein each of the second hexagonal elements is individually disposed within a respective one of the plurality of first hexagonal elements. The double hexagonal honeycomb structure 190 can be made with a highly flexible double wall carbon fiber honeycomb that can be filled with polymer foam. The double hexagonal honeycomb structure 190 can be layered with one or more layers of fluid polymer 150, as shown in FIG. 9C. This highly compressible/flexible sandwich structure 200 can absorb energy by 75% compression of the original thickness and subsequently return to pre-impacted shape within a short period of time without permanent damage or degradation in strength. The double hexagonal honeycomb structure 190 at the core of the sandwich structure 200 provides a high stiffness to weight ratio, high barrier resistance, and high impact resistance. High stiffness was demonstrated using finite element analysis and prototype testing.

Figure 10:
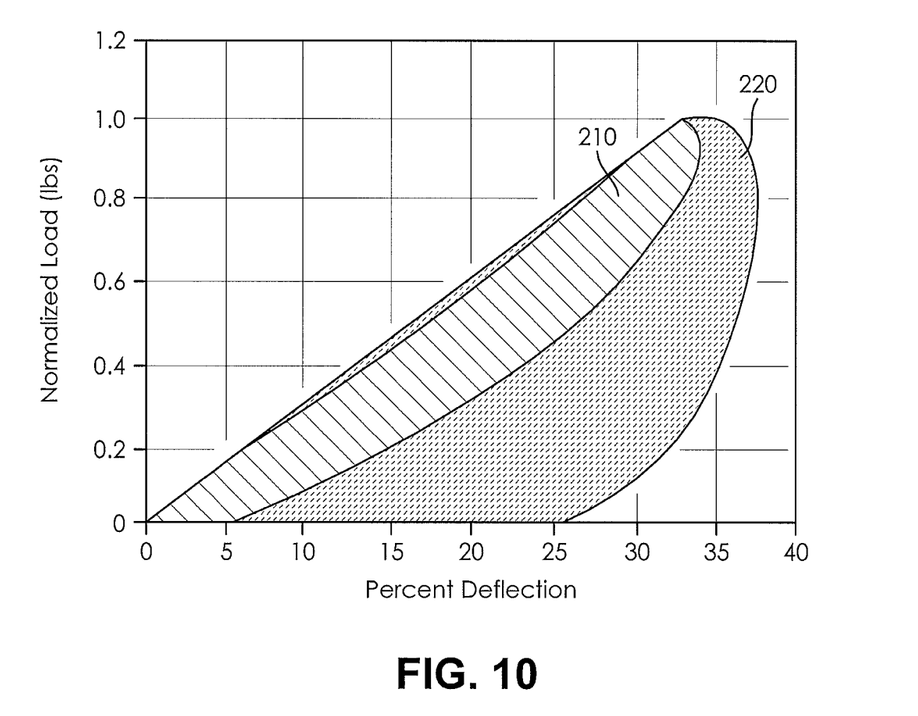
FIG. 10 graphically depicts impact absorption as a function of percent deflection versus normalized load for natural rubber in comparison with the double wall hexagonal structure.

The graph in FIG. 10 shows the impact absorption as a function of percent deflection versus normalized load, illustrating the high hysteresis that is important for efficient impact absorption. The behavior of natural rubber is shown by the area at 210 and behavior of the highly compressible/flexible sandwich structure 200 is shown by the area at 220. It can be seen in FIG. 10 that the area indicated at 210 for natural rubber is only a portion of the overall area indicated at 220 for the sandwich structure 200. Furthermore, comparison of the area under the curves demonstrates the advantage of the highly compressible/flexible sandwich structure 200 versus natural rubber, as the sandwich structure 200 removes most of the impact energy from the system. The behavior of the sandwich structure 200 is in contrast to natural rubber, as natural rubber is more elastic and returns energy to the system. High-energy return can cause high rebound and increase the potential for damage. The sandwich structure 200 provides improved cushioning and energy absorption while providing a stable landing platform. The sandwich structure 200 does not breakdown and maintains substantially the same cushioning performance throughout the life of the CMIPL, while reducing impact shock, stress, and fatigue.

Polymer foam filling the honeycomb structure 190 turns mechanical energy into heat. As the polymer foam is deformed, molecular friction generates heat. This "lost energy" is called hysteresis. Energy is translated perpendicularly away from the axis of incidence and its effect is pushed nearly 90 degrees out of phase from the original disturbance. This phase shift, known as Tan Delta, is a measure of the polymer foam damping effectiveness. The higher the value of Tan Delta, the greater the amount of damping that occurs.

The various CMIPLs can be formed using various methods, including lamination, bonding, and adhesion methods. One example is use of Long Fiber Thermoplastic (LFT) molding, for example, allowing the bonding of various fluid polymer laminates to the composite layer. Examples of fluid polymers include laponite synthetic mineral. Concentration of Laponite crystals in deionized water (or another liquid) can be tailored to provide the desired properties. For example, 4% of laponite is sufficient to form a thixotropic gel, however, concentrations as high as 10% can be employed to obtain the desired stiffness. The fluid polymer can also include a polymer gel or viscoelastic fluid polymer, where examples include various lightly crosslinked elastomers. Polymer gels can include a cross-linked polymer network inflated with a solvent such as water. Such polymer gels can exhibit the ability to reversibly swell or shrink (e.g., up to 1000 times in volume) due to small changes in their environment (pH, temperature, electric field), and can therefore be readily tailored to obtain desired properties. Other examples of fluid polymers include polyvinyl alcohol (PVA), polyacrylic acid (PAA), polyacrylonitrile (PAN), and combinations thereof. A further example of a fluid polymer may include a worm-like micellar fluid. A skilled artisan may select suitable types of fluid polymer, as desired.

Various configurations of the CMIPL can be used with a protective helmet. In some embodiments, the CMIPL can include a dual layer, a sandwich layer, or a multilayer fluid polymer system with a combination of strain thickening and strain thinning fluid polymer components, where the CMIPL reduces the rotational acceleration, rotational strain rate, and rotational strain that can lead to a concussion. The CMIPL can also be formed from a single elastomer layer. The CMIPL can include an elastomer honeycomb layer. The CMIPL can be used within a helmet, where one or more thin hybrid sandwich layers of shear thinning and shear thickening polymers fit on the wearer's head beneath the padding and hard helmet shell. In other embodiments, one or more thin hybrid sandwich layers of shear thinning and shear thickening polymers fit between the padding and hard helmet shell of the helmet.

The CMIPL can also have a stiffness exhibiting a non-linear response to reduce the possibility of a user's head from bottoming out against the helmet shell in response to an impact having a designated characteristic. This type of CMIPL can performs better in lower and higher translational acceleration impacts with the strain thickening layer, where the strain thinning layer dissipates angular acceleration. The CMIPL can be flexible both in high and low angular strain rate due to combine material characteristics of shear thickening and shear thinning fluids. Combination of strain thickening and strain thinning properties can further provide a time-dependent adaptive response to impacts.

In certain embodiments, the fluid polymer can exhibit non-Newtonian fluid (NNF) behavior and can include a material comprising a dual layer with shear thickening and shear thinning effects that is provided by one or more polymers alone or by a combination of one or more polymers together with one or more other components; e.g. a polymer blend, a particulate material, a viscous fluid, or mixtures thereof. The CMIPL can also include a sandwich of two open-cell reticulated foams filled separately with shear thickening and shear thinning liquids.

The CMIPL can be employed in a wide variety of applications, such all type protective helmets, sports helmets including racing helmets, bike helmets, hockey helmets, lacrosse helmets. The aspects of the various CMIPLs described herein can also be incorporated into protective pads or protective clothing or padding for elbows, knees, and shins. Likewise, aspects of the various CMIPLs can be used in shoe soles, mid soles, football footwear, and other athletic equipment such as boxing gloves.

The CMIPL and protective gear employing the CMIPL, such as a helmet, afford certain benefits and advantages. The CMIPL can reduce rotational impact force. The CMIPL can be made thin and can be incorporated into a helmet so that the addition of the CMIPL is not a hindrance for the linear impact protection capability of padding already present in the helmet or configured for the helmet. Incorporation of the CMIPL can be done without impeding the vibration dampening property of the helmet shell. The CMIPL provides a durable, lightweight, low profile, and low maintenance addition to a protective helmet and can be adapted for various head sizes. A helmet including a CMIPL provided by the present technology can better protect a wearer's head and may reduce the effect of an impact on the wearer's skull, neck, and/or spine.

EXAMPLES

A CMIPL was constructed using a hybrid multilayer/dual layer of shear thickening fluid polymer and shear thinning fluid polymer. The CMIPL provides a non-Newtonian characteristic in its unique ability to change fluid viscosity with impact strain rate. The CMIPL provides a wider range of multidirectional and rotational impact damping by utilizing the synergistic effect of the strain thickening and strain thinning fluid properties. This liner is effective both in compression and shear strain. Shear thickening and shear thinning characteristics of the CMIPL are important for angular rotational impact and serve to maintain the fluid-like state at the application strain rates as shown below in Table 1.

An empirical and computational head-helmet model is used to evaluate various biomedical head impact injury predictors. A finite element analysis model is used to evaluate CMIPL to estimate the intracranial pressure, brain strain, linear and rotational acceleration, and linear and rotational strain rate in response to blunt impact with another helmet or with the ground. Table 1 provides a data comparison of no helmet, a conventional helmet, and a conventional helmet with CMIPL based on biomedical head impact injury predictors.

TABLE 1

Results of impact with no helmet, a conventional helmet without CMIPL, and a conventional helmet with CMIPL.

| Biomedical Head Impact Injury Predictors | No Helmet | Conventional Helmet w/o CMIPL | Conventional Helmet with CMIPL |
|---|---|---|---|
| Impact Linear Acceleration (ILA), m/s$^2$ | 1885 | 728 | 695 |
| Impact Linear Velocity (ILV), m/s | 10 | 6 | 5 |
| Impact Linear Strain Rate (ILSR), s$^{-1}$ | 90 | 65 | 40 |
| Impact Linear Strain (ILS) | 0.08 | 0.06 | 0.06 |
| Impact Angular Acceleration (IAA), rad/s$^2$ | 9850 | 7925 | 1195 |
| Impact Angular Strain Rate (IASR), s$^{-1}$ | 150 | 120 | 10 |
| Impact Angular Strain (IAS) | 0.4 | 0.35 | 0.05 |
| Impact Angular Velocity (IAV) rad/s | 90 | 70 | 30 |

TABLE 2

Reduction in concussion risk using various conventional helmets incorporating the CMIPL.

| Product | Shell/Liner | 5 STAR Rating (2013)* | Reduction in Concussion Risk with Helmet Liner |
|---|---|---|---|
| RIDDELL ® 360 ™ | plastic/thermoplastic urethane | 5 star rating | ~56% |
| RIDDELL ® REVOLUTION SPEED ™ | plastic/thermoplastic urethane | 5 star rating | ~30% |
| RAWLINGS ® QUANTUM PLUS ™ | plastic/foam + large offset design | 5 star rating | ~6% |
| XENITH X2 ™ | plastic/air bladder | 5 star rating | ~5% |
| SG ™ | carbon fiber/PP foam | none | >1% |

*As of 2013 the VIRGINIA TECH ® 5 Star rating has only looked at linear impacts; future ratings are expected to take rotational impacts into consideration.

Advantageous technical benefits of the present disclosure are that this new helmet liner will reduce rotational acceleration, reduce linear acceleration, and reduce contact forces and impact vibration from an actual impact during the game.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A composite multi-axial impact protection liner for a protective device comprising:
   a fluid polymer layer including at least one of a strain thickening fluid polymer and a strain thinning fluid polymer, and
   a composite layer having a distribution of structural regions and open regions, the structural regions and the open regions defined by a double hexagonal honeycomb structure, the double hexagonal honeycomb structure including a plurality of first hexagonal elements and a plurality of second hexagonal elements, each of the second hexagonal elements individually disposed within a respective one of the plurality of first hexagonal elements, the fluid polymer layer abutting the composite layer,
   wherein the liner is configured to be inserted into the protective device.

2. The liner of claim 1, wherein the fluid polymer layer includes a strain thickening fluid polymer and a strain thinning fluid polymer.

3. The liner of claim 1, wherein the fluid polymer layer includes a first layer of the strain thickening fluid polymer and a second layer of the strain thinning fluid polymer.

4. The liner of claim 1, wherein the fluid polymer layer comprises an elastomer.

5. The liner of claim 1, wherein the fluid polymer comprises a gel.

6. The liner of claim 1, wherein the fluid polymer comprises a member of the group consisting of polyvinyl alcohol (PVA), polyacrylic acid (PAA), polyacrylonitrile (PAN), and combinations thereof.

7. The liner of claim 1, wherein the fluid polymer comprises laponite.

8. The liner of claim 1, wherein the double hexagonal honeycomb structure comprises carbon fiber.

9. The liner of claim 1, wherein the open regions are filled with a polymer foam.

10. A helmet comprising the liner of claim 1.

11. The helmet of claim 10, wherein the liner is disposed intermediate to a hard shell and a padding layer.

12. The helmet of claim 10, wherein the helmet is configured as a football helmet.

13. The liner of claim 1, wherein the fluid polymer comprises a micellar fluid.

14. A wearable protective device comprising:
    a hard shell; and
    a composite multi-axial impact protection liner disposed within the shell and including:
      a fluid polymer layer having at least one of a strain thickening fluid polymer and a strain thinning fluid polymer; and
      a composite layer having a distribution of structural regions and open regions, the structural regions and the open regions defined by a double hexagonal honeycomb structure, the double hexagonal honeycomb structure including a plurality of first hexagonal elements and a plurality of second hexagonal elements, each of the second hexagonal elements individually disposed within a respective one of the plurality of first hexagonal elements, the fluid polymer layer abutting the composite layer.

15. The device of claim 14, wherein at least a portion of the open regions is filled with a polymer foam.

16. The device of claim 14, wherein the fluid polymer layer includes a first layer of the strain thickening fluid polymer and a second layer of the strain thinning fluid polymer and the composite layer is disposed intermediate to the first layer and the second layer.

17. A multi-axial impact protection liner for a protective device comprising a layer having a distribution of structural regions and open regions, the structural regions and the open regions defined by a double hexagonal honeycomb structure, the double hexagonal honeycomb structure including a plurality of first hexagonal elements and a plurality of second hexagonal elements, each of the second hexagonal elements individually disposed within a respective one of the plurality of first hexagonal elements.

18. A multi-axial impact protection liner for a protective device comprising a layer of highly crosslinked elastomer having a hardness of 10-20 shore A, and a composite layer having a distribution of structural regions and open regions, the structural regions and the open regions defined by a double hexagonal honeycomb structure, the double hexagonal honeycomb structure including a plurality of first hexagonal elements and a plurality of second hexagonal elements, each of the second hexagonal elements individually disposed within a respective one of the plurality of first hexagonal elements, the layer of highly crosslinked elastomer abutting the composite layer.

* * * * *